| United States Patent [19] | [11] 3,896,163 |
|---|---|
| Jacques | [45] July 22, 1975 |

[54] PURIFICATION OF ALIPHATIC PHOSPHONIC ACIDS

[75] Inventor: Albert M. V. Jacques, Norristown, Pa.

[73] Assignee: Amchem Products, Inc., Ambler, Pa.

[22] Filed: May 31, 1974

[21] Appl. No.: 474,993

[52] U.S. Cl............ 260/502.4 R; 260/961; 260/990
[51] Int. Cl................................................ C07c 9/38
[58] Field of Search...................... 260/990, 502.4 R

[56] References Cited
UNITED STATES PATENTS

| | | | |
|---|---|---|---|
| 2,658,909 | 11/1953 | Crandall et al. | 260/990 |
| 2,976,310 | 3/1961 | Vaughn | 260/990 |
| 3,146,255 | 8/1964 | Nelson et al. | 260/990 |
| 3,787,486 | 1/1974 | Randall et al. | 260/502.4 R |
| 3,833,645 | 9/1974 | Thiobald et al. | 260/502.4 R |

*Primary Examiner*—Joseph E. Evans
*Attorney, Agent, or Firm*—Ernest G. Szoke; Michael E. Zall; Howard S. Katzoff

[57] ABSTRACT

A process for separating an aliphatic phosphonic acid from an aliphatic phosphonic acid half-ester, by extracting the half-ester from an aqueous crude reaction mixture of the aliphatic phosphonic acid and the half-ester by using an alkyl ester of carbonic acid, preferably diethyl carbonate, as an extracting solvent. The alkyl ester of carbonic acid may be recovered for re-use in the process. This process is particularly useful in separating 2-chloroethyl phosphonic acid from its corresponding half-ester, mono-2-chloroethyl-2-chloroethyl phosphonate.

14 Claims, No Drawings

PURIFICATION OF ALIPHATIC PHOSPHONIC ACIDS

BACKGROUND OF THE INVENTION

This invention relates to a process for the purification of aliphatic phosphonic acids, and more particularly to the purification of 2-haloethylphosphonic acids and still more particularly to the purification of 2-chloroethylphosphonic acid.

It is known in the art, that 2-haloethylphosphonic acids and derivatives thereof, are valuable as plant growth regulators in the agricultural field. Thus the compounds, particularly the chloro compound, have been used extensively as plant growth regulators for increasing crop yield of, for example, pineapples, soybeans and the like. The usefulness of these compounds is illustrated, for example, in the publication Nature, Vol. 218, p. 974 (1969) by Cooke and Randall; and British Pat. No. 1,194,433 of C. D. Fritz and W. F. Evans "Process and Composition for the Regulation of Plant Growth", published June 10, 1970.

One process for the preparation of 2-haloethylphosphonic acids and derivatives thereof, is the cleavage of the corresponding di-ester with aqueous HCl. The aqueous HCl acid cleavage is a procedure known in the art, it is illustrated, for example, in the textbook of Kosolapoff, entitled, "Organo Phosphorous Compounds," John Wiley & Sons, Inc., N. Y., around 1950, p. 139, which indicates that esters of phosphonic acids are cleaved by hot hydrochloric or hydrobromic acids at atmospheric pressure.

Another process for the preparation of 2-haloethylphosphonic acids and derivatives thereof, is the cleavage of the corresponding di-ester with anhydrous HCl at 100° to 160° C. The anhydrous HCl acid cleavage is also a procedure known to the art. It is illustrated, for example, in the article by E. L. Gefter and N. I. Kabachnik, Plasticeskie Massy 1961, No. 1, pp. 63–64.

The above processes involve the acid cleavage of the ester groups from the di-ester of the phosphonic acid to yield the corresponding phosphonic acid.

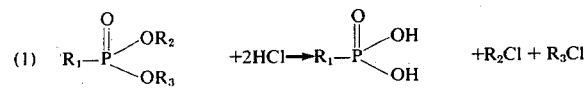

(1)

This cleavage reaction for the production of phosphonic acid occurs in a stepwise manner. The di-ester is converted to the half-ester which is in turn cleaved to the phosphonic acid.

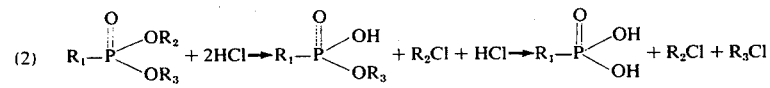

(2)

This reaction is an example of a consecutive reaction.

For example, cleavage of the bis (2-chloroethyl)-2-chloroethyl phosphonate (the di-ester), depending upon reaction conditions and concentrations of anhydrous HCl, can produce from 45 to 84% 2-chlorethylphosphonic acid and from 3 to 30% of mono-2-chloroethyl-2-chloroethylphosphonate (the half-ester of 2-chloroethylphosphonic acid).

As shown by the foregoing described processes, a major impurity resulting from the production of 2-haloethylephosphonic acid and derivatives thereof, is the half-ester of the corresponding acid.

It is highly desirable when applying 2-haloethylphosphonic acid and derivatives thereof, to plants, that the composition applied be sufficiently free of impurities, such as the half-esters of the 2-haloethylphosphonic acids, to avoid the toxic, or potentially toxic effects of these impurities on the plants. It is thus, highly desirable to remove the half-ester from the crude reaction mixture obtained from the cleavage of the di-ester of the corresponding acid.

None of the above published processes for the cleavage of the di-ester to the desired 2-haloethylphosphonic acid and derivatives thereof, has been suitable for providing the highly pure products desired for commercial use.

Further, none of the heretofore, known processes for the purification of 2-haloethylphosphonic acids and derivatives thereof, has been found suitable for providing the highly pure products for commercial use.

U.S. Pat. No. 3,626,037 MONO-2-HALOETHYL ESTERS OF 2-HALOETHANE PHOSPHONIC ACID, by Randall and Wynn, Dec. 17, 1971, describes the extraction with benzene of the mono-2-chloroethyl ester of 2-chloroethane phosphonic acid from a reaction mixture containing this mono-ester and 2-chloroethane phosphonic acid. The disadvantages of using benzene as a commercially practical extracting solvent are that it is highly flammable, acutely toxic to humans, and gives poor phase separation when used as an extracting solvent for the half-ester of haloethylphosphonic acids.

U.S. Pat. application 872,766 PREPARATION OF BETA-HALOETHYLPHOSPHONIC ACID by D. I. Randall, filed Oct. 20, 1969, describes the extraction of the mono-ester of 2-haloethylphosphonic acid from the crude reaction mixture with a halohydrocarbon of from one to eight carbon atoms, such as, chlorobenzene, dichlorobenzene, chloroform, tetrachloroethylene and preferably methylene chloride or ethylene dichloride. The disadvantages of using halohydrocarbons as commercially practical extracting solvents are that they are highly toxic to humans and are poor extracting solvents for purifying 2-haloethylphosphonic acids.

An object of this invention is to provide a new process for purifying aliphatic phosphonic acids.

Another object of this invention is to provide a process for producing such pure acids at low cost.

Still another object of this invention is to provide a new process which is particularly suitable for purifying 2-haloethylphosphonic acid, and more particularly, 2-chloroethylphosphonic acid.

These and other objects of the invention will be more apparent from reading the following detailed description thereof.

Attainment of the above objects are made possible by the present invention which includes a process for separating an aliphatic phosphonic acid from an aliphatic phosphonic acid half-ester by extracting the half-ester from an aqueous crude reaction mixture of the aliphatic phosphonic acid and the half-ester, by using an alkyl ester of carbonic acid as an extracting solvent. The alkyl ester of carbonic acid may be recovered for reuse in the process.

More particularly, the aqueous crude reaction mixture is comprised of:

an aliphatic phosphonic acid, represented by the formula:

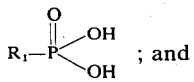
; and an aliphatic phosphonic acid half-ester,
(hereinafter referred to as "half-ester") represented by the formula:

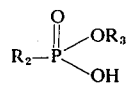

wherein $R_1$, $R_2$ and $R_3$ are each independently selected from the group consisting of alkyl, alkenyl, halo-substituted alkyl and halo-substituted alkenyl, all having from one to six carbon atoms. It is preferred that $R_1$, $R_2$ and $R_3$ be the same substituents. It is more preferable that $R_1$, $R_2$ and $R_3$ be 2-haloethyl; and still more preferable, 2-chloroethyl substituents, i.e. 2-chloroethyl phosphonic acid and mono 2-chloroethyl-2-chloroethyl phosphonate.

The extracting solvent is a compound represented by the formula:

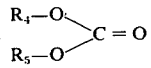

wherein $R_4$ and $R_5$ are each independently alkyl having from 1 to 6 carbon atoms.

It is preferred that $R_4$ and $R_5$ be the same substituents. It is more preferable that both $R_4$ and $R_5$ be ethyl, i.e. diethylcarbonate.

As used herein, the term alkyl represents straight or branched chain saturated hydrocarbons.

The term alkenyl represents straight or branched chain aliphatic hydrocarbons containing at least one double bond.

The terms halo-substituted alkyl and halo-substituted alkenyl includes alkyl and alkenyl groups having one or more hydrogens replaced by halogen which can be bonded to the same or different carbon atoms in the alkyl or alkenyl group.

The term halo as used herein includes all four halogens, namely chlorine, bromine, iodine and fluorine.

As only representative examples of the phosphonic acids, or mixtures thereof, which may be in the aqueous crude reaction mixture, there may be mentioned:
vinyl phosphonic acid
1-chloroethylphosphonic acid
2-chloroethylphosphonic acid
1-chloropropylphosphonic acid
2-chloropropylphosphonic acid
2-chlorobutylphosphonic acid
methylphosphonic acid
ethylphosphonic acid
propylphosphonic acid
butylphosphonic acid As only representative examples of the half-esters, or mixtures thereof, which may be in the aqueous crude reaction mixture, there may be mentioned:
mono-2-chloroethyl-2-chloroethylphosphonate
mono-2-chloroethyl-vinyl phosphonate
mono-methyl-methyl phosphonate
mono-ethyl-ethyl phosphonate
mono-ethyl-2-chloroethyl phosphonate
mono-methyl-ethyl phosphonate
mono-2-chloroethyl-methyl phosphonate The chloro substituents on the above representative examples may instead be bromo, iodo and/or fluoro.

Preferably the aqueous crude reaction mixture is comprised of 2-haloethylphosphonic acid and mono-2-haloethyl-2-haloethylphosphonate and more preferably, comprised of 2-chloroethylphosphonic acid (hereinafter referred to as "ethephon") and mono-2-chloroethyl-2-chloroethylphosphonate (hereinafter referred to as MEPHA).

As only representative examples of the extracting solvents, for extracting the half-ester from the aqueous crude reaction mixture, there may be mentioned:
dimethyl carbonate
diethyl carbonate
dipropyl carbonate
methyl-ethyl carbonate
ethyl-propyl carbonate
dibutyl carbonate
dihexyl carbonate The preferred extracting solvent is di-ethyl carbonate (hereinafter referred to as DEC).

The liquid-liquid extraction procedure used for extracting the half-ester from the aqueous crude reaction mixture containing the aliphatic phosphonic acid and the half-ester, is comprised of placing in intimate contact with the crude reaction mixture the extracting solvent so that mass transfer can occur. After equilibrum has been reached the aqueous phase (containing the major portion of the phosphonic acid) and the solvent phase (containing the extracting solvent and the half-ester) are mechanically separated. After one contacting and separating sequence it may be desirable to further treat each phase, for example, in countercurrent fashion. Finally the solvent and aqueous phase may each be concentrated to obtain, respectively, the extracting solvent for reuse and the phosphonic acid. The concentration of the solvent and aqueous phases can be accomplished, for example, by distillation.

An example of the liquid-liquid extraction procedure used for extracting the half-ester from the aqueous crude reaction mixture containing the aliphatic phosphonic acid and the half-ester, is to place in intimate contact with the aqueous crude reaction mixture the extracting solvent, agitate and let settle. There will be a phase separation. The lower aqueous phase will contain, primarily, the phosphonic acid. The upper solvent phase will contain, primarily, the half-ester and the extracting solvent. The phases are then separated. The solvent phase can then further be washed with water to obtain maximum separation of the aliphatic phosphonic acid from the half-ester. The aqueous phase can then be flash evaporated to dryness, to obtain the desired purity of aliphatic phosphonic acid. The solvent phase can be distilled to obtain the extracting solvent for reuse.

This invention contemplates the use of any of the standard methods of liquid-liquid extraction and any of the standard methods of concentrating the solvent and aqueous phases thus obtained from the liquid-liquid extraction.

For example, the aqueous phase may be flash evaporated at a temperature of about 40° C. to about 85° C. under a vacuum of about 0.09 mm Hg to about 10 mm Hg.

For example, the solvent phase may be distilled under a temperature of about 80° C. to about 85° C. under a vacuum of about 0.09 mm Hg to about 10 mm Hg.

The liquid-liquid extraction may be carried out at any temperature below the boiling point of the lowest boiling component in the system. Usually the extraction is carried out at about 10° to 30° C.

The liquid-liquid extraction of this invention contemplates any operative weight ratio of crude reaction mixture/water/total extracting solvent. It is preferred, however, that this ratio be about 1 part crude reaction mixture to 2½ parts water to 5 parts extracting solvent, by weight.

The following examples are illustrative of the various embodiments of this invention and are not to be regarded as limiting.

EXAMPLE 1

38.7 grams of crude reaction mixture containing 29.4% ethephon and 55.7% MEPHA was added to 50 ml. of water. The resulting mixture was then extracted three times with 50 ml. of chloroform. The resulting solvent phases, after separation from the aqueous phases by a separatory funnel, were combined and further extracted two times with 50 ml. of water.

The combined solvent phases resulting from this further extraction, after separation from the aqueous phases, were flash evaporated under a vacuum of 0.09 mm Hg at a temperature of 80°–85° C. until no solvent remained. 13.3 grams of material was obtained containing 1.6% ethephon and 76.1% MEPHA.

The combined aqueous phases were then flash evaporated under a vacuum of 0.09 mm Hg for 30 minutes at a temperature of 80°–85° C., resulting in a material containing 48% ethephon and 32.2% MEPHA.

The material obtained from the above aqueous phase evaporation was then still further extracted by combining the material with 10 ml. of water, extracting 3 times with 40 ml. of chloroform and separating the resulting aqueous and solvent phases.

The resulting solvent phases were combined and then flash evaporated over anhydrous sodium sulfate. 5.5 grams of material was obtained, containing 15.5% ethephon and 69.1% MEPHA.

The resulting aqueous phases were combined and then flash evaporated under a vacuum of 0.05 mm Hg for 30 minutes. 14.5 grams of material was obtained containing 68.3% ethephon and 8.75% MEPHA.

The 14.5 grams of material, obtained from the aqueous phase, was then again extracted by combining it with 5 ml. of water and extracting three times with 50 ml. of chloroform.

Evaporation of the combined solvent phases resulted in 1.3 grams of material containing 33% ethephon and 55.2% MEPHA.

Evaporation of the combined aqueous phases resulted in 11.2 grams of material containing 81.7% ethephon and 3.2% MEPHA.

This example shows that the use of chloroform as an extracting solvent, is highly impractical, when compared to the use of diethyl carbonate as an extracting solvent. In this example, 38.7 grams of crude reaction mixture required 420 ml. of chloroform. As the subsequent examples will indicate, much less diethyl carbonate is needed to obtain the same or similar level of purity of aliphatic phosphonic acid.

EXAMPLE 2

Twenty grams of crude reaction mixture containing 83.8% ethephon and 3.1% MEPHA was added to 50 ml. of water. The resulting mixture was then extracted 4 times with 20 ml. of DEC. The combined solvent phases, after separation from the aqueous phases, were dried over anhydrous sodium sulfate, filtered and flash evaporated under a vacuum of 0.09 mm Hg at a temperature of 80°–85° C. .9 grams of material was obtained containing 73.2% ethephon and 21.6% MEPHA.

The aqueous phase was then flash evaporated under a vacuum of 0.09 mm Hg for 30 minutes at a temperature of 80°–85° C. 19.3 grams of material was obtained, containing 85.6% ethephon and 0.9% MEPHA.

The original 20 grams of crude reaction mixture contained 0.4% vinyl phosphonic acid. After the above procedure was followed there was 0.7% vinyl phosphonic acid in the material obtained from the solvent phase and 3.7% in the material obtained from the aqueous phase, indicating that vinyl-phosphonic acid is also concentrated by the process of this invention.

EXAMPLE 3

Nineteen grams of a crude reaction mixture containing 83.7% ethephon and 1.8% MEPHA were diluted with 60 ml. of water. This was then extracted five times with 20 ml. of DEC. The combined solvent phases, after separation, from the aqueous phases were then dried over anhydrous sodium sulfate, filtered, and flash evaporated under a vacuum of 0.09 mm Hg and a temperature of 80°–85° C. until there was no more solvent. 0.8 grams of material were obtained containing 83.1% ethephon and 12.9% MEPHA.

The aqueous phase was then flash evaporated to dryness under a vacuum of 0.09 mm Hg at a temperature of 80°–85° C. for 90 minutes. 17.5 grams of material was obtained containing 85.4% ethephon and 1.0% MEPHA.

The original 19 grams of crude reaction mixture contained 0.8% vinyl phosphonic acid. After the above procedure was followed there was a negligible amount of vinyl phosphonic acid in the material obtained from the solvent phase and 0.7% in the material obtained from the aqueous phase.

EXAMPLE 4

Twenty grams of a crude reaction mixture containing 44.9% of ethephon, 30.1% of MEPHA, 1.1% 1-chloroethyl phosphonic acid, 0.9% Bis-2 chloroethyl-2-chloroethyl-phosphonate, and 0.9% mono-ethyl-2-chloroethyl-phosphonate was diluted with 50 ml. of water. This was then extracted five times with 20 ml. of DEC.

The combined solvent phases, after separation from the aqueous phases, were then dried over anhydrous sodium sulfate, filtered and flash evaporated at a pressure of 5–10 mm Hg and a temperature of 85° C. for about 30 minutes. Approximately, 6 grams of a clear liquid was obtained, containing 39.5% ethephon and 56.7% MEPHA.

The aqueous phase, after separation, was then flash evaporated at a pressure of 0.09 mm Hg and a temperature of 85° C. for 30 minutes. 15.4 grams of material was obtained containing 83.7% of ethephon and 3.2% MEPHA.

The original 20 grams of crude reaction mixture contained 1.6% vinyl phosphonic acid. After the above procedure was followed there was a negligible amount of vinyl phosphonic acid in the material obtained from the solvent phase and 2.8% in the material obtained from the aqueous phase.

EXAMPLE 5

A

Twenty grams of a crude reaction mixture containing 64.3% ethephon 22.7% ethephon was diluted with 50 ml. of water. This was then extracted five times with 20 ml. of DEC.

The solvent phase, after separation, was then dried over anhydrous sodium sulfate, filtered and flash evaporated under a vacuum of 0.09 mm Hg and a temperature of 85° C. for approximately 30 minutes. 5.6 grams of liquid was obtained, containing 38.1% ethephon and 50.4% MEPHA.

The aqueous phase, after separation, was then flash evaporated under a vacuum of 0.14 mm Hg at a temperature of 80°–85° C. for about 15 minutes. 12.3 grams of material was obtained, containing 83.5% ethephon and 3.0% MEPHA.

The original 20 grams of crude reaction mixture contained 0.8% vinyl phosphonic acid. After the above procedure was followed there was a negligible amount of vinyl phosphonic acid in the material obtained from the solvent phase and 3.6% in the material obtained from the aqueous phase.

B

The above procedure was repeated using the same composition crude reaction mixture and diethyl ketone (DEK) as the extracting solvent. 1.5 grams of liquid was obtained from the solvent phase containing 62.3% ethephon and 27.4% MEPHA and 2% vinyl phosphonic acid; and 6.9 grams of material was obtained from the aqueous phase, containing 82.6% ethephon, 0.7% MEPHA and 3.3% vinyl phosphonic acid.

C

The above procedure was again repeated using the same composition of crude reaction mixture and methyl-iso-butyl ketone (MIBK) as the extracting solvent. 9.3 grams of liquid material was obtained from the solvent phase containing 59.2% ethephon, 32.6% MEPHA and 1.6% vinyl phosphonic acid; and 7.2 grams of material was obtained from the aqueous phase containing 83.1% ethephon, 1.1% MEPHA and 3.5% vinyl phosphonic acid.

Examination of the weight yield of ethephon in the aqueous phase (yield ethephon) as a percent of ethephon in the crude reaction mixture (available ethephon), indicates that DEC is a vastly superior extracting solvent when compared to DEK or MIBK.

|  | Solvent | Yield Ethephon Available Ethephon |
|---|---|---|
| Example 5A | DEC | 80.0% |
| Example 5B | DEK | 44.4% |
| Example 5C | MIBK | 46.6% |

EXAMPLE 6

Twenty grams of crude reaction mixture containing 64.3% ethephon and 22.7% of MEPHA was dissolved in 50 ml. of DEC and extracted 5 times with 20 ml. of water.

The solvent phase was dried over anhydrous sodium sulfate, filtered, and flash evaporated under a vacuum of 0.09 mm Hg at a temperature of 80°–85° C. for about 30 minutes. One gram of liquid was obtained containing 87.0% MEPHA and a negligible amount of ethephon.

The combined aqueous phases were then flash evaporated under a vacuum of 0.9 mm Hg at a temperature of 80°–85° C. for about 15 minutes. 13.7 grams of material was obtained containing 76% ethephon and 15.2% MEPHA.

Comparing Example 5 with Example 6, it can be seen that extraction with DEC is preferable to extraction with water.

EXAMPLE 7

Test A

Twenty grams of crude reaction mixture containing 64.5% ethephon and 18.6% MEPHA were dissolved in 50 ml. of water. This was then followed by extraction 5 times with 20 ml. of DEC. The five solvent phases were then separately dried over anhydrous sodium sulfate, filtered and flash evaporated under a vacuum of 0.09 mm Hg at a temperature of 85° C.

The aqueous phase was flash evaporated at a vacuum of 0.9 mm Hg at a temperature of 85° C. for about 15 minutes. 13.2 grams of material was obtained.

Test B

Twenty grams of crude reaction mixture containing 64.5% ethephon and 18.6% MEPHA were dissolved in 50 ml. of DEC. This was then followed by extracting five times with 20 ml. of water. The five aqueous phases were then evaporated under a vacuum of 0.9 mm Hg for 15 minutes at a temperature of 80°–85° C.

The solvent phase was then dried over an anhydrous sodium sulfate, filtered and flash evaporated under a vacuum of 0.09 mm Hg at a temperature of 80°–85° C. for approximately 30 minutes. 1.1 grams of liquid material was obtained.

A comparison of the results from Tests A and B indicates that dissolving the crude reaction mixture in water, followed by extracting with DEC is preferable to dissolving the crude reaction mixture in DEC followed by extracting by water.

The following Table is a summary of the results obtained from Tests A and B:

EXAMPLE 7

| | Original Solution | TEST A (Extraction with DEC) | | | | | | TEST B (Extraction with Water) | | | | |
|---|---|---|---|---|---|---|---|---|---|---|---|---|
| | | Solvent Phases | | | | Aqueous Phase | Solvent Phase | | Aqueous Phases | | | |
| | | 2 | 3 | 4 | 5 | | | 1 | 2 | 3 | 4 | 5 |
| Weight (Grams) | 20 gm | 2.0 gm | 1.1 gm | .9 gm | .6 gm | .1 gm | 13.2 gm | 1.1 gm | 5.2 gm | 5.2 gm | 2.0 gm | .8 gm | .4 gm |
| Component | | | | | | | | | | | | | |
| Ethephon | 64.5% | 37.7% | 41.7% | 46.1% | 50.5% | 54.7% | 77.7% | .4% | 73.9% | 76.6% | 64.7% | 31.6% | 8.9% |
| MEPHA | 18.6% | 53.8% | 50.8% | 46.4% | 37.8% | 35.3% | 3.6% | 77.6% | 6.4% | 10.9% | 27.2% | 62.2% | 83.7% |

EXAMPLE 8

Test A

Twenty grams of crude reaction mixture containing 64.5% ethephon and 18.6% MEPHA were dissolved in 50 ml. of water. The solution was then mixed gradually with 100 ml. of DEC. This was allowed to stand for 15 minutes in a separatory funnel and the resultant liquid and aqueous phases were then separated.

The solvent phase was then dried over anhydrous sodium sulfate, filtered and flash evaporated under a vacuum of 0.09 mm Hg at a temperature of 80°–85° C. for approximately 30 minutes. 5.8 grams of liquid was obtained.

The aqueous phase was then flash evaporated at a vacuum of 0.9 mm Hg for 15 minutes at a temperature of 80°–85° C. 13.4 grams of material was obtained.

Test B

Twenty grams of crude reaction mixture containing 64.5% ethephon and 18.6% MEPHA was dissolved in 20 ml. of water. This was then extracted 5 times with 20 ml. of DEC.

The aqueous and solvent phases were separated and flash evaporated as described in Example 8, TEST A.

Test C

Twenty grams of crude reaction mixture containing 64.5% ethephon and 18.6% MEPHA were dissolved in 35 ml. of water. This was then extracted five times with 20 ml. of DEC.

The solvent and aqueous phases were separated and flash evaporated as described in Example 8, TEST A.

A comparison of the results from Tests A, B and C indicates that the yield of ethephon obtained from the available ethephon increases as the weight ratio of water to crude reaction mixture increases. The yield also increases as the weight ratio of DEC to water decreases.

The following is a summary of the results of Tests A, B and C:

EXAMPLE 8

| COMPONENT | CRUDE SOLUTION (%) | TEST A (One Extraction with DEC) | | TEST B (Five Extractions with DEC) | | TEST C (Five Extractions with DEC) | |
|---|---|---|---|---|---|---|---|
| | | SOLVENT PHASE (%) | AQUEOUS PHASE (%) | SOLVENT PHASE (%) | AQUEOUS PHASE (%) | SOLVENT PHASE (%) | AQUEOUS PHASE (%) |
| Ethephon | 64.5 | 41.4 | 74.9 | 60.5 | 81.6 | 50.2 | 81.8 |
| MEPHA | 18.6 | 51.2 | 6.9 | 29.0 | 1.3 | 39.7 | 2.1 |
| WEIGHT/RATIO | | | | | | | |
| Crude Reaction Mixture/Water/DEC (Weight/Weight) | | 1:2 ½:5 | | 1:1:5 | | 1:1.75:5 | |
| Yield Ethephon (%) Available Ethephon | | 77.8% | | 36.8% | | 66% | |

EXAMPLE 9

Nine grams of crude reaction mixture containing 74.1% ethephon and 11.5% MEPHA were dissolved in 16 ml. of water. This was then followed by extraction five times with 9 ml. of DEC.

The solvent phase was dried over anhydrous sodium sulfate, filtered and flash evaporated under a vacuum of 0.09 mm Hg at a temperature of 80°–85° C. for approximately 30 minutes. 1.4 grams of liquid material was obtained containing 56.8% ethephon and 35.6% MEPHA.

The aqueous phase was then flash evaporated under a vacuum of .3 mm Hg for 20 minutes at a temperature of 85° C. 7.2 grams of crystalline material was obtained, containing 86.5% ethephon and 1.8% MEPHA.

EXAMPLE 10

Fifty pounds of water was added to a 16 gallon polyethylene tank.

Twenty-five pounds of crude reaction mixture containing 70.35% ethephon and 22.79% MEPHA was added to the tank and dissolved in the water by agitating for 15 minutes.

Thirty-four pounds of DEC was added to the tank and agitated for 15 minutes. The mixture was allowed to settle and the upper solvent phase was separated from the lower aqueous phase. Each phase was weighed and a sample of it taken for analysis.

The resulting aqueous phase, remaining in the tank, was extracted three more times, each with 34 pounds of DEC.

Samples of the aqueous and solvent phases were flash evaporated and analyzed.

The following is a summary of the results:

|  | Aqueous Phase | | | Solvent Phase | | |
|---|---|---|---|---|---|---|
|  | *Ethephon | *MEPHA | **WEIGHT (Pounds) | *Ethephon | *MEPHA | **WEIGHT (Pounds) |
| Extraction 1 | 70.49% | 18.75% | 64.5 | 46.56% | 50.78% | 44 |
| Extraction 2 | 76.72% | 7.93% | 61.0 | 50.40% | 43.60% | 36.5 |
| Extraction 3 | 82.61% | 3.54% | 58.5 | 58.64% | 35.50% | 35. |
| Extraction 4 | 88.89% | 1.9% | 56.5 | 68.52% | 24.% | 35. |

*Analysis of sample after flash evaporation
**Weight of solvent or aqueous phase including water.

EXAMPLE 11

Ten grams of a crude reaction mixture containing 84.34% ethephon and 12.25% MEPHA were diluted with 17.5 ml. of water. This was then extracted 5 times with 10 ml. of DEC. The combined solvent phases, after separation, from the aqueous phases were then dried over anhydrous sodium sulfate, filtered, and flash evaporated under a vacuum of 5 mm Hg and a temperature of about 85°C. unitl there was no more solvent. 4.4 grams of material were obtained containing 69.06% ethephon and 24.83% MEPHA.

The aqueous phase was then flash evaported to dryness under a vacuum of 5 mm Hg at a termperature of about 85°C. 5.4 grams of material was obtained containing 97.08 % ethephon and 0.73% MEPHA.

EXAMPLE 12

Ten grams of a crude reaction mixture containing 84.34% ethephon and 12.25% MEPHA were diluted with 17.5 ml. of water. This was then extracted 5 times with 10 ml. of di-n-hexylcarbonate. The combined aqueous phases, after separation from the solvent phases, were then dried over anhydrous sodium sulfate, filtered, and flash evaported under a vacuum of 5 mm Hg and a termperature of about 85°C. 9.4 grams of material were obtained containing 86.38% ethephon and 9.70% MEPHA.

EXAMPLE 13

Ten grams of a crude reaction mixture containing 87.1% ethephon and 8.7% mono-2-chloroethyl-n-butyl phosphonate were diluted with 17.5 ml. of water. This was then extracted five times with 10 ml. of DEC. The combined solvent phases, after separation, from the aqueous phases were then dried over anhydrous sodium sulfate, filtered, and flash evaporated under a vacuum of 5 mm Hg and a temperature of about 85°C. until there was no more solvent. 2.3 grams of material were obtained containing 63.23% ethephon and 26.48% of mono-2-chloroethyl-n-butyl phosphonate.

The aqueous phase was then flash evaporated to dryness under a vacuum of 5 mm Hg at a temperature of about 85°C. 5.5 grams of material was obtained containing 96.18% ethephon and 1.31% of mono-2-chloroethyl-n-butyl phosphonate.

I claim:

1. A process for separating an aliphatic phosphonic acid, represented by the general formula:

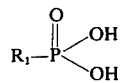

from an aliphatic phosphonic acid half-ester, represented by the general formula:

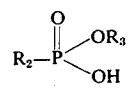

wherein $R_1$, $R_2$ and $R_3$ are each independently selected from the group consisting of alkyl, alkenyl, halo-substituted alkyl and halo-substituted alkenyl, all having from 1 to 6 carbon atoms, which comprises:

extracting the half-ester from an aqueous crude reaction mixture, comprised of the half-ester and the phosphonic acid, with an alkyl ester of carbonic acid represented by the general formula:

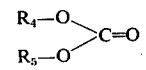

wherein $R_4$ and $R_5$ are each independently alkyl having from 1 to 6 carbon atoms.

2. The process of claim 1, wherein $R_2$ and $R_3$ are the same.

3. The process of claim 1, wherein $R_1$, $R_2$ and $R_3$ are the same.

4. The process of claim 1, wherein $R_2$ and $R_3$ are the same halo-substituted alkyl.

5. The process of claim 1, wherein $R_1$, $R_2$ and $R_3$ are the same halo-substituted alkyl.

6. The process of claim 1 wherein $R_2$ and $R_3$ are the same halo-substituted alkyl and $R_1$ is alkenyl.

7. The process of claim 1, wherein the half-ester is mono-2-haloethyl-2-haloethylphosphonate and the aliphatic phosphonic acid is 2-haloethylphosphonic acid.

8. The process of claim 1, wherein the half-ester is mono-2-chloroethyl-2-chloroethylphosphonate and the aliphatic phosphonic acid is 2-chloroethylphosphonic acid.

9. The process of claim 1, wherein $R_4$ and $R_5$ are the same.

10. The process of claim 1, wherein the alkyl ester of carbonic acid is diethyl carbonate.

11. The process of claim 1, wherein the half-ester is mono-2-chloroethyl-2-chloroethyl phosphonate and the aliphatic phosphonic acid is vinyl phosphonic acid.

12. The process of claim 1, wherein the half-ester is mono-2-haloethyl-2-haloethylphosphonate, the aliphatic phosphonic acid is 2-haloethylphosphonic acid, and the alkyl ester of carbonic acid is diethyl carbonate.

13. The process of claim 1, wherein the half-ester is mono-2-chloroethyl-2-chloroethylphosphonate, the aliphatic phosphonic acid is 2-chloroethylphosphonic acid and the alkyl ester of carbonic acid is diethyl carbonate.

14. The process of claim 1, wherein the alkyl ester of carbonic acid is di-n-hexylcarbonate.

* * * * *